United States Patent
Rouchon

(10) Patent No.: US 10,988,875 B2
(45) Date of Patent: Apr. 27, 2021

(54) APPARATUS FOR TREATING A MINERAL FIBER MAT BY DETECTING AND REMOVING LOCALISED DEFECTS, AND CORRESPONDING METHOD

(71) Applicant: SAINT-GOBAIN ISOVER, Courbevoie (FR)

(72) Inventor: Jean-Maurice Rouchon, Saint Sulpice le Gueretois (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 218 days.

(21) Appl. No.: 16/307,574

(22) PCT Filed: Jun. 9, 2017

(86) PCT No.: PCT/FR2017/051469
§ 371 (c)(1),
(2) Date: Dec. 6, 2018

(87) PCT Pub. No.: WO2017/216453
PCT Pub. Date: Dec. 21, 2017

(65) Prior Publication Data
US 2019/0301063 A1 Oct. 3, 2019

(30) Foreign Application Priority Data
Jun. 17, 2016 (FR) ...................................... 1655654

(51) Int. Cl.
*D04H 1/4218* (2012.01)
*G01N 21/898* (2006.01)
(Continued)

(52) U.S. Cl.
CPC ......... *D04H 1/4218* (2013.01); *D04H 1/4209* (2013.01); *D04H 3/002* (2013.01);
(Continued)

(58) Field of Classification Search
None
See application file for complete search history.

(56) References Cited

U.S. PATENT DOCUMENTS 3,218,844 A * 11/1965 Kleist ...................... D06H 3/00
73/37.5
4,240,815 A * 12/1980 Brelen ................... G01G 17/02
65/379
(Continued)

FOREIGN PATENT DOCUMENTS

EP 2 947 117 A1 11/2015
JP 2003-105665 A 4/2003
(Continued)

OTHER PUBLICATIONS

International Search Report dated Nov. 22, 2017 in PCT/FR2017/051469 filed Jun. 9, 2017.

*Primary Examiner* — Mary Lynn F Theisen
(74) *Attorney, Agent, or Firm* — Oblon, McClelland, Maier & Neustadt, L.L.P.

(57) ABSTRACT

An apparatus for treating a mat of mineral fibers moving along a plane and a run direction, by detection and elimination of localized defects, includes a first transport member, a second transport member positioned after the first transport member in the run direction and separated therefrom in the run direction by a treatment zone, a device for detecting localized defects in the mat of mineral fibers, upstream of the treatment zone in the run direction, and in the treatment zone, a device for eliminating defects suitable for eliminating, in-line, a defect detected by the detection device by eliminating the portion of mat containing it.

20 Claims, 3 Drawing Sheets

(51) Int. Cl.
*D04H 1/4209* (2012.01)
*D04H 3/004* (2012.01)
*D04H 3/002* (2012.01)
*G01N 25/72* (2006.01)

(52) U.S. Cl.
CPC ......... *D04H 3/004* (2013.01); *G01N 21/8983* (2013.01); *G01N 25/72* (2013.01)

(56) References Cited

U.S. PATENT DOCUMENTS

| | | | |
|---|---|---|---|
| 4,592,769 A * | 6/1986 | Lemaignen | D04H 3/03 65/377 |
| 5,009,031 A * | 4/1991 | Knop | D04H 1/4209 47/64 |
| 2009/0179152 A1 | 7/2009 | Ellison | |
| 2015/0266203 A1* | 9/2015 | Santamaria | B32B 17/02 264/115 |

FOREIGN PATENT DOCUMENTS

| WO | WO 2007/128942 A1 | 11/2007 | |
|---|---|---|---|
| WO | WO-2014053778 A1 * | 4/2014 | ........... D04H 1/4226 |

* cited by examiner

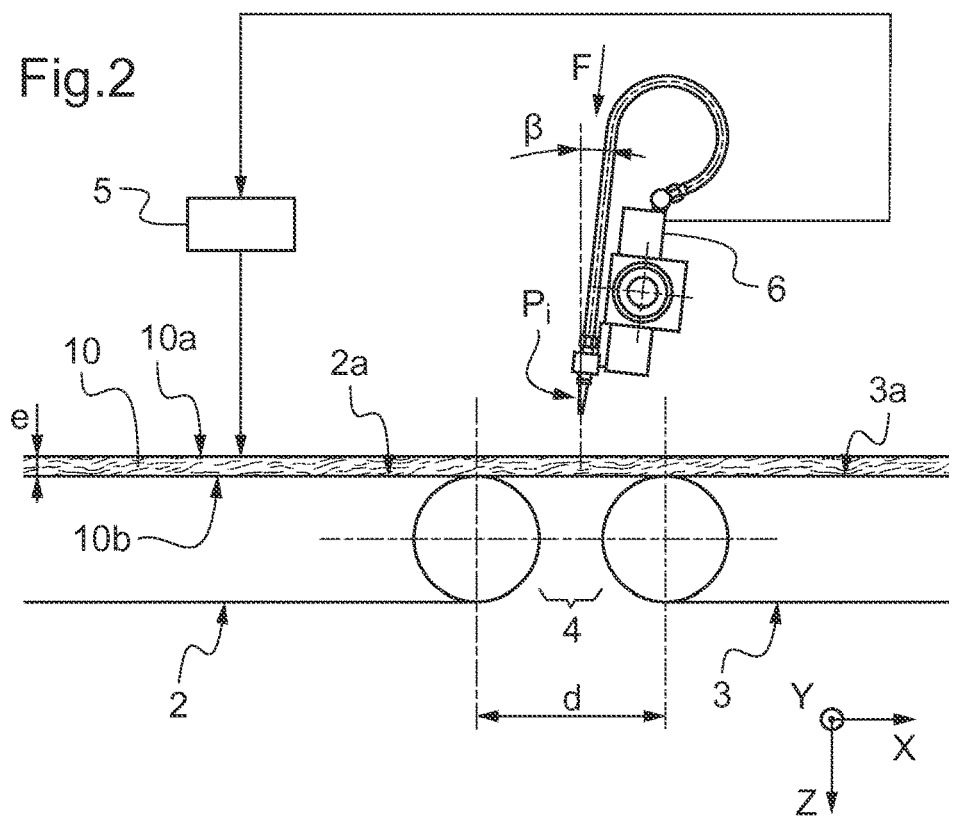
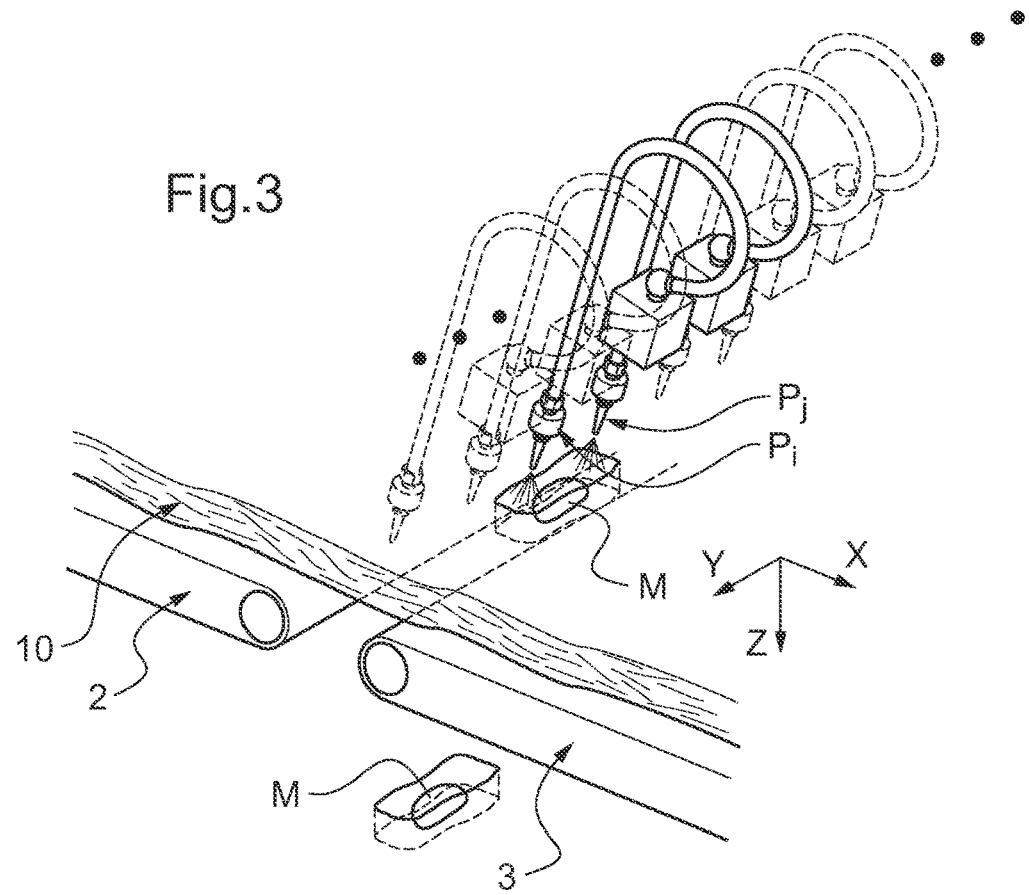

APPARATUS FOR TREATING A MINERAL FIBER MAT BY DETECTING AND REMOVING LOCALISED DEFECTS, AND CORRESPONDING METHOD

BACKGROUND

The present description relates to the manufacture of products made of mineral wool, in particular based on rock wool or glass wool. More particularly, the present document relates to the treatment of localized defects which may in particular be present within fiber mats obtained during or at the end of a process for manufacturing products intended for example for acoustic and/or thermal insulation.

Insulation products based on mineral wool currently marketed typically consist of panels, boards, rolls or products of tubular or other shape obtained from a mat or felt of mineral fibers, such as glass fibers or rock fibers, consolidated by an organic or mineral binder, or by a mechanical technique such as needlepunching. They may also be in the form of loose wool flakes, obtained from a mat or a blanket of mineral fibers collected without provision of binder, then reduced into small-sized fibrous clusters by a technique known as nodulizing.

The process for manufacturing these fiber mats is well known and typically comprises the series of the following steps:
- the melting of the mineral material,
- the conversion into fibers, by a so-called rotary fiberizing technique using rotational fiberizing members, or by a technique of attenuation by high-velocity gas jets,
- optionally the spraying onto the fibers of a liquid intended for binding or sizing of the fibers,
- the accumulation of the fibers on a receiving surface in the form of a thicker or thinner layer referred to as a blanket or mat,
- thermal, mechanical or thermomechanical treatments or molding of the blanket or mat in order to give it cohesion or on the contrary to reduce it to fragments,
- a final preparation of the resulting products.

Thus, for example in the case of rock wool, the manufacturing process typically comprises the series of the following steps:
- the melting of the rock generally in a furnace or a cupola furnace at a temperature of the order of 1500° C.,
- the fiberizing, i.e. the obtaining of rock fibers by pouring the molten material into an external centrifugation device known for this purpose, equipped with a series of horizontal-axis rotors,
- the spraying of a binding compound comprising a generally thermosetting binder in aqueous solution onto the newly formed fibers,
- the receiving of the fibers impregnated with the binder in the form of a blanket of bound fibers, on a receiving belt,
- optionally a cross-lapping that superimposes several layers of said blanket of fibers,
- a firing in a drying oven or a furnace at a temperature and for a duration sufficient to enable the curing and the crosslinking of the binder and the elimination of the residual water,
- a cutting of the fiber mats, in the longitudinal direction (in order for example to avoid uneven edges), transverse direction and optionally in the thickness direction (splitting), generally using a saw or a guillotine, so as to obtain blocks that will then be able to be arranged as boards or in a roll,
- optionally the packaging of the boards or rolls thus obtained, for example the wrapping thereof by a plastic film, then
- the storage of the boards.

The glass wool production process breaks down in a similar manner except that a mixture of glass batch materials is melted in a furnace and an internal centrifugation device is used for the fiberizing, which comprises one or more fiberizing members referred to as a fiberizing spinner or disk, rotating about a vertical axis and comprising a peripheral annular wall pierced with orifices through which the molten material is ejected in the form of filaments which are then attenuated by high-velocity gas jets.

Within the context of the production process as has just been described, certain defects may appear, linked to the variation of certain parameters of the process or to the malfunction of certain devices.

Two categories of localized defects, i.e. defects present only at certain very localized points of the felt, are described below by way of example:

1) defects of the "hot spot" type, which correspond to zones of high rock or glass density. Such defects arise from the fiberizing process. They may result from instabilities or accumulations of unfiberized material. They may also be in the form of solid inclusions such as pieces of glass that have overflowed from the spinner in the case of glass wool, or even metal pieces resulting from the wear of a fiberizing member, or else batch stones, or pieces of coke originating from the cupola furnace in the case of rock wool. They are characterized by very localized clusters inside the fibrous mat. These clusters may either cool rapidly within the felt and thus to give rise to extremely dense and hard zones on which the cutting devices (saw, guillotine) may then break or crack, or cool much more slowly due to the thermal inertia of the hot mass held in an insulating mat, which may in extreme cases result in the whole of the product catching fire, for example in storage areas or when being transported by truck;

2) defects of the "wet spot" type, which appear at locations where, during the fiberizing step, a cluster of higher density of water and/or of resin (binder) forms. During the drying step, the hot air passing through the mat then has a tendency to skirt round this point of higher density, at which a high humidity therefore remains. These wet spots may then generate esthetic defects during use. Insulation of walls via the outside comprising an insulation panel covered with a rendering could thus exhibit undesirable marks of brown color, after implementation, at the wet spots of the panel.

Patent application WO 2007/128942 describes a method for detecting localized defects of the aforementioned type in a mat of mineral fibers bound by a binder, at the outlet of the manufacturing process, in other words at the outlet of the crosslinking drying oven. According to this method, the detection device may be coupled to means for regulating at least one parameter chosen from the group consisting of the composition of the binder, the suction force, the crosslinking temperature of the fibers, the residence time in the crosslinking means. According to one variant, the detection device may also be coupled to means for regulating a member positioned downstream of the analysis device, said member being configured to isolate and/or downgrade the areas of the mat that include the defects or to very precisely mark said areas, for example with a view to a subsequent sorting or cutting.

This method does not however make it possible to discharge the defects and a fortiori sufficiently upstream of the manufacturing process. Consequently, the amount of material to be scrapped in the case of detecting defects remains high.

BRIEF SUMMARY

One subject of the present description is to solve the aforementioned problem.

Of course, the hot spots and wet spots mentioned above are only some examples of localized defects within the meaning of the present description. Generally, any defect and in particular any local variation of the mat structure, or local variation in color, or local variation in the concentration of fibers and/or of water and/or of binder within the mat should be considered to be included in the present description.

According to the present description, the aforementioned objective is achieved by means of an apparatus for treating a mat of mineral fibers, in particular of glass fibers or of rock fibers, moving along a plane and a run direction, by detection and elimination of localized defects, in particular hot spots or wet spots, the apparatus comprising:

a first member for transporting the mat of mineral fibers,
a second member for transporting the mat of mineral fibers, the second transport member being positioned after the first transport member in the run direction and separated therefrom in said direction by a treatment zone,
a device for detecting localized defects in the mat of mineral fibers, located upstream of the treatment zone in the run direction, and
in the treatment zone, a device for eliminating defects suitable for eliminating, in-line, a defect detected by the detection device by eliminating the portion of mat containing it.

The elimination of the defects is carried out in-line, in other words during the transportation of the mat of fibers, and without interruption of this transportation.

The apparatus may thus be integrated into a facility for manufacturing a product based on mineral fibers, without the other stations of the manufacturing facility requiring any particular adaptation.

Throughout the present description, a transport member is understood very generally to mean any member suitable for receiving the mat of fibers and enabling the displacement of the mat. A transport member may for example be a conveyor, a drum, a receiving belt or any other suitable device.

The mat treated by the treatment apparatus is advantageously a blanket of mineral fibers bound with the aid of a binder that is not yet cured, and which blanket is intended for the manufacture of a board or roll of insulating wool.

As an alternative, however, the treated mat may also be a mat of mineral fibers which is free of binder. In this case, the mat is for example derived from a fiber blanket which is optionally previously de-carded, and forms a cluster of fibers without cohesion. Such a product may be any type of wool packaged loose and may for example be used subsequently as spraying wool or blowing wool (in particular of the type sold under the brand Insulsafe®).

Although the mat is produced from a fibrous material, it is overall possible to define two main faces of the mat. The distance between these two main faces defines the thickness of the mat.

Starting from these main faces, it is possible to locally define a run plane of the mat. At any point of the mat, this run plane corresponds to the plane tangent to one of the main faces of the mat.

The run direction of the mat is, itself also, defined locally.

Preferably, the elimination device is configured so that the portion of the mat containing the defect is discharged in an incident elimination direction, i.e. through the thickness of the mat, the elimination direction advantageously being substantially parallel to the normal to the run plane of the mat. The expression "substantially parallel" is understood here to mean forming with this normal direction an angle of between 0 and 45°. It is understood that the elimination of the defect thus forms a hole that passes right through the mat, over the entire thickness thereof.

According to one example, the detection device is static, and advantageously makes it possible to analyze the entire width of the mat, for example with a lateral resolution of the order of 10 mm.

According to one example, in particular in the case of hot spots, the detection device is suitable for scanning the surface of the mat and measuring or deducing a surface temperature of the mat.

For example, the detection device comprises at least one infrared radiation detection member, in particular an infrared scanner.

The use of infrared radiation makes it possible to re-establish information characteristic or representative of the temperature of the mat, without contact. Another advantage is that this method makes it possible to detect hot spots of small dimensions (of the order of 10 mm in width).

In certain cases, and in particular for the detection of wet spots, the detection device may, as an alternative, comprise at least one microwave detection device.

According to yet another exemplary embodiment, in particular for detecting color inhomogeneities of the mat, the detection device may comprise a video camera.

The aforementioned examples are not however limiting, and other types of detection could be envisaged as other alternatives.

According to one example, the elimination device comprises pressure or pulling means, in particular mechanical or pneumatic means, stressing a portion of the mat in an elimination direction.

The pressure means according to the present description should be understood as being able to comprise any fluid or solid element suitable for exerting a pressure force on the mat of mineral fibers.

A pressure means may thus nonlimitingly be in the form of a presser finger, or in the form of a jet of fluid, in particular of air or water or oil, under pressure.

The pulling means according to the present description should be understood as being able to comprise any fluid or solid element suitable for exerting a pulling force on the mat of mineral fibers.

This includes in particular mechanical extraction means such as a hook inserted in the mat then withdrawn while exerting a pull on the defect, or else suction means.

Advantageously, the application direction of the force exerted by the pressure or pulling means (which corresponds to the aforementioned elimination direction) forms an angle of between 3° and 20°, preferably between 3° and 10°, more preferentially still between 4° and 6°, with a normal to the run plane. It has been observed that these angle values are advantageous since they make it possible to correctly cut the blanket without deforming it.

The elimination device is advantageously suitable for locally eliminating the portion of mat containing a defect. In other words, the device may be suitable for eliminating a portion of mat having a width of less than the width of the mat.

According to one example, the elimination device comprises a plurality of pressure or pulling members, oriented toward the treatment zone, and distributed in a lateral direction of the apparatus.

It is possible to locally define a lateral direction of the apparatus as a direction orthogonal to the run direction of the mat and parallel to the run plane at the same point.

This lateral direction is generally parallel to the main faces of the transport members, with which the mat is intended to come into contact.

It is understood that pressure or pulling members are thus distributed, preferably regularly, over the entire width of the mat of fibers, in the treatment zone.

Advantageously, these members are then suitable for being controlled independently of one another (i.e. selectively).

Advantageously, the apparatus comprises transmission means for transmitting to the elimination device information on the positioning of the defect in the lateral direction, and means for selective control of each pressure or pulling member as a function of said information. It is thus possible to actuate only the pressure or pulling member(s) located directly opposite the part of the mat containing the detected defect, when the mat passes through the treatment zone. Owing to these arrangements, and by multiplying the pressure or pulling members, it is possible to reduce the volume of mat discharged to the necessary minimum.

According to one example, the spacing between the first transport member and the second transport member is between and 150 mm, preferably between 80 and 120 mm. This distance is sufficient to eliminate the hot spots of substantial size (maximum diameter of greater than 80 mm), but nevertheless makes it possible to maintain the run continuity of the mat (no collapse of the mat between the two transport members).

The spacing between the first transport member and the second transport member is here considered to be the distance separating the extreme point of the main face of the first transport member (point beyond which the mat is no longer in contact with the first conveyor, in the run direction) and the extreme point of the main face of the second transport member (point before which the mat is no longer in contact with the second conveyor, in the run direction), in the run direction.

According to one example, the apparatus further comprises, in the treatment zone, at least one hatch suitable for being opened and closed in a controlled manner under the mat of mineral fibers. Advantageously, the hatch forms a transport surface for the mat of mineral fibers, between the first and second transport members and in the direct continuity of these two transport members.

This arrangement may in particular be envisaged in the case where the mat of mineral fibers is a mat of fibers that are not bound by a binder. In this case, the mat consists of a cluster of fibers without cohesion between them, which necessitates being moved on a continuous support. The hatch forms both this support and the elimination device: when the hatch is open, the fibers located on the hatch fall by gravity and are thus discharged.

The present description also relates to a production line for producing a product based on mineral fibers, in particular on glass fibers or on rock fibers, comprising at least:
   a fiberizing device for obtaining mineral fibers,
   a device for spraying a binder on said mineral fibers, for the formation of a mat of mineral fibers bound by a binder, and
   a binder crosslinking device, wherein the production line further comprises, between the spraying device and the binder crosslinking device, a treatment apparatus as defined above.

According to one example, the production line further comprises a device for cross-lapping the mat of fibers, between the treatment apparatus and the binder crosslinking device.

The detection of defects upstream of the cross-lapping has several advantages: the detection is carried out on a mat of lower basis weight, and is therefore more reliable, and on the other hand the elimination of the defect has no impact on the quality of the final product, since the hole resulting from the elimination of a portion of the mat is covered by the thicknesses of lapped fibers.

According to one example, the production line further comprises a crimping device, between the treatment apparatus and the binder crosslinking device. The crimping technique, known per se, consists in producing a reduction in speed during the journey of the mat in the line, in order to create an accumulation of fibers which densifies the structure of the mat. The crimping operation also makes it possible to compensate for the local lack of fibers level with the portion of mat discharged, by rearranging the fibers. In this regard, according to the invention, the crimping may be triggered solely in response to the elimination of a defect.

The present description also relates to a process for treating a mat of mineral fibers, in particular of glass fibers or of rock fibers, moving along moving along a plane and a run direction a run direction, by detection and elimination of localized defects, in particular hot spots, comprising:
   transporting the mat of mineral fibers on a first transport member, then on a second transport member positioned after the first transport member and separated therefrom by a treatment zone in the run direction,
   detecting localized defects in the mat of mineral fibers, upstream of the treatment zone in the run direction, and
   in the treatment zone, eliminating, in-line, a detected defect by eliminating the portion of mat containing it.

Preferably, the portion of the mat containing the defect is eliminated in an elimination direction substantially parallel to the normal to the run plane of the mat.

According to one example, the elimination of the portion of mat containing the defect is carried out by stressing said portion in an elimination direction by pressure or pulling means.

According to one example, the mat of mineral fibers is a blanket of mineral fibers bound by a binder.

According to one example, the mat of mineral fibers is a mat of mineral fibers that are not bound by a binder.

According to one example, the detection of localized defects comprises the use of infrared radiation.

The present description finally relates to a process for manufacturing a product based on mineral fibers bound by a binder, in particular glass fibers or rock fibers, comprising at least:
   the obtaining of mineral fibers,
   the spraying of a binder on said mineral fibers, for the formation of a mat of mineral fibers bound by a binder, and
   the crosslinking of the binder,
the process further comprising, between the spraying and the crosslinking of the binder, the treatment of the mat of mineral fibers by detection and elimination of localized defects, in particular hot spots or wet spots, according to the treatment process as defined above.

According to one implementation example, the production process further comprises the cross-lapping of the mat of mineral fibers, between the treatment and the crosslinking of the binder.

According to one implementation example, the production process further comprises the crimping of the mat of mineral fibers, between the treatment and the crosslinking of the binder.

The details of the invention will be better understood on reading the following description of an embodiment of the present treatment apparatus within a production line for producing a product based on mineral fibers. Within the context of the present invention, other embodiments are of course possible, the following description being provided solely by way of illustration and not to be considered as limiting in any of the aspects thereof described.

BRIEF DESCRIPTION OF THE DRAWINGS

FIG. 2 is a cross-sectional view along the plane II from FIG. 1.

FIG. 3 illustrates the elimination of the portion of mat containing the defect M, with the treatment apparatus from FIGS. 1 and 2.

DETAILED DESCRIPTION

Figure 1:
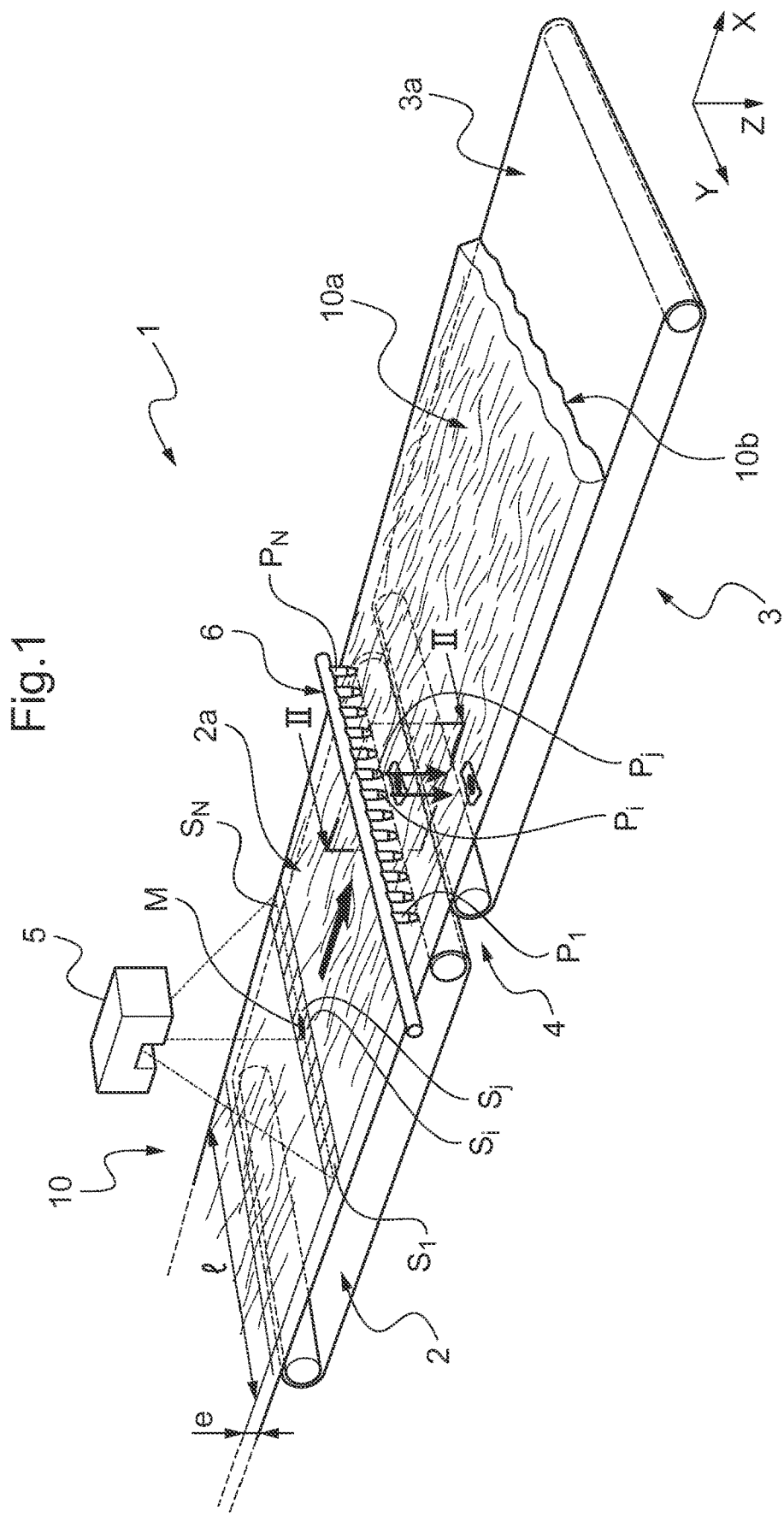
FIG. 1 illustrates an apparatus for detecting and eliminating defects according to one embodiment of the present invention.

Illustrated in FIG. 1 is an apparatus 1 for treating a mat of mineral fibers 10, for example rock fibers, moving along a run direction X, by detection and elimination of localized defects M, in particular hot spots.

The treatment apparatus 1 comprises:
- a first transport member 2
- a second transport member 3, positioned after the first transport member 2 in the run direction X of the mat and separated therefrom in said direction X by a treatment zone 4,
- a device 5 for detecting localized defects in the mat of mineral fibers, located upstream of the treatment zone 4 in the run direction X, and
- in the treatment zone 4, a device 6 for eliminating defects M suitable for eliminating, in-line, the defects M detected by the detection device 5, by eliminating portions of the mat 10 containing them.

The first and second transport members 2, 3 are here endless belts mounted around parallel axes, and driven by a motor. Each one comprises a main face respectively 2a, 3a, here an upper face, intended to come into contact with the mat of mineral fibers 10, and, more particularly, to support this mat of mineral fibers 10. These could, in an equivalent manner, be chain conveyors or roller table conveyors.

The main faces 2a, 3a of the first and second conveyors are flat (although this is in no way limiting). They may be located in one and the same plane, as illustrated in FIGS. 1 to 3, or may optionally be inclined relative to one another.

The first and second conveyors 2, 3 are spaced apart from one another, and separated, in the run direction X of the mat, by the treatment zone 4.

The spacing between the first transport member and the second transport member, referenced d in FIG. 2, corresponds to the distance separating the main face 2a of the first conveyor 2 and the main face 3a of the second conveyor 3, in the run direction X. This spacing d is advantageously between 50 and 150 mm, preferably between 80 and 120 mm.

The mat of fibers 10 is here a blanket of rock fibers bound with the aid of a binder that is not yet cured, and which blanket is intended for the manufacture of a board or roll of insulating wool (hereafter blanket).

The mat 10 is then overall in the form of a continuous strip having two parallel main faces 10a, 10b, one of which (10b) is here in contact with the conveyors 2, 3. The mat has a width 1 and a thickness e, as illustrated in FIG. 1.

The width 1 of the mat 10 is for example between 1000 and 4000 mm. Its thickness e is typically between 10 and 30 mm. The basis weight of the mat is for example between 300 and 500 g/m$^2$.

As explained above, at any point of the mat, a run plane is defined tangent to one of the main faces 10a, 10b thereof.

Furthermore, locally a lateral direction Y is defined as the direction orthogonal to the run direction X of the mat and parallel to said run plane at the same point.

The defect detection device 5 is, in the example, an infrared scanner located above the first conveyor 2, in other words upstream of the treatment zone 4.

The scanner 5 is here static, and has a field of vision that scans at least the entire width 1 of the blanket in the lateral direction.

Its field of vision is divided, in the lateral direction, into N sections S1, . . . , Sn, . . . , SN, preferentially of constant width (less than or equal to 1/N).

The scanner 5 is suitable for re-establishing at any instant information characteristic or representative of the surface temperature of the mat in the aforementioned N sections of its field of vision. If the temperature measured in one or more of these sections at an instant t is considered to be above a predetermined threshold (for example 250° C. or 300° C. or 350° C.), corresponding information, comprising the X and Y coordinates of the section(s) in question (respectively in the run and lateral directions), is transmitted to the elimination device 6.

The elimination device 6 is located downstream of the detection device 5, in the run direction X.

More specifically, the elimination device 6 is located between the first and second transport members 2, 3.

It comprises, in the example, N pressure members P1, . . . , Pn, . . . , PN, oriented toward the treatment zone 4, in other words toward the portion of the blanket 10 located in the space separating the first and second transport members 2, 3.

In the particular example represented, the N pressure members P are compressed air nozzles, controlled by solenoid valves, as a function in particular of the information transmitted by the detection device 5.

According to one advantageous arrangement, each nozzle is a so-called amplifying nozzle, i.e. entraining, in its operation, induced ambient air. The air consumption for a given blowing force is thus reduced. Therefore, this type of nozzle can be used at standard pressure of a compressed air network, typically between 5 and 6 bar, and does not necessitate the addition of a booster pump.

By way of example, it has been observed that a nozzle, for which the blowing force (=maximum force exerted on a balance located 150 mm from the nozzle, during the blowing) is greater than or equal to 22 N, is particularly suitable for a fiber blanket having a basis weight of between 300 and 500 g/m$^2$, spaced apart from the nozzle by a distance of between 50 and 200 mm, preferably between 80 and 100 mm.

The pressure members P may be controlled selectively, as a function of the exact positioning of the defect M, in the lateral direction Y and in the run direction X. For example, a single nozzle may be actuated in order to eliminate a defect of small dimensions. In other cases, several nozzles adjacent to one another may be actuated simultaneously, in order to enlarge the width of material removed. Represented in FIG. 1 is a defect M extending over two sections Si and Sj treated by the scanner 5.

The time t between the detection of the defect and the operation of the solenoid valves is set in advance, as a function of the run speed of the mat 10, so that the jet of air originating from the nozzles P encounters the portions of the mat containing the defect M at the moment they pass through the treatment zone 4, and so that these portions are discharged, under the effect of the pressure of the air.

The actuating time of the nozzles P itself depends on the X coordinates of the detected defect. If this defect extends over a given length of the mat, in the run direction, the opening time of the solenoid valve(s) is consequently adjusted.

Preferably, and as illustrated in greater detail in FIG. 2, the nozzles Pi are positioned so that the application direction of the blowing F is slightly inclined relative to the normal Z to the run plane.

According to one advantageous arrangement, the blowing direction (direction of the pressure force exerted by each nozzle in the direction of the mat) forms an angle beta ($\beta$) of between 3 and 20°, preferably between 3 and 10°, more preferentially still between 4 and 6° (for example 5°) with the normal (Z) to the run plane of the mat. It has been observed that these angle values are advantageous since they make it possible to correctly cut the blanket without deforming it.

Represented in FIG. 3 is the elimination of the portion of the mat 10 containing the defect M, by means of the nozzles Pi, Pj. The portion of mat, subjected to the pressure force exerted by the two nozzles, comes away from the mat and a localized hole is formed therein, that passes through the entire thickness of the mat, without damaging the adjacent portions. The defective mat portion passes between the conveyors and is recovered under the mat, for example in a recovery container, in order to be able to be treated (for example recycled after having been cooled, in the case of hot spots).

The treatment apparatus 1 described above is given only by way of example and obviously does not limit the present invention.

Thus, for example, the pressure means could be mechanical pressure means, typically in the form of N pressure fingers, that can be actuated selectively.

Also, the elimination device may comprise pulling members, for example mechanical members of the extraction hook type or suction devices, instead of the aforementioned pressure members, or else a combination of these two types of members.

Equally, the relative positioning of the first and second transport members may be different from that illustrated in FIGS. 1 to 3. Although, in most cases, the first and second transport members are located one after the other, they may, as a variant, be superimposed or else form an angle between them, for example a 90° angle.

Finally, the treated mat may be a mat of mineral fibers which is free of binder. In this case, the mat is for example derived from a fiber blanket which is optionally previously de-carded, and forms a cluster of fibers without cohesion. Such a product may be used subsequently as blowing wool or to manufacture spraying wool.

In this case, the mat may not move between the first and second transport members without a support element. This support element may then advantageously be formed by at least one hatch suitable for being opened and closed in a controlled manner under the mat of mineral fibers. It is understood that the hatch then forms a transport surface for the mat of mineral fibers, between the first and second transport members and in the direct continuity of these two transport members. When the hatch is open, the fibers located on the hatch fall, either solely under the effect of gravity (in the absence of pressure or pulling means), or under the combined effect of gravity and pressure or pulling means of the type described above, and are thus discharged.

Obviously, in order to limit the amount of mat eliminated, the apparatus may advantageously comprise a plurality of hatches distributed in the width direction of the apparatus and the hatches may be actuated selectively (independently of one another), depending on the exact positioning of the defect detected.

Figure 4:
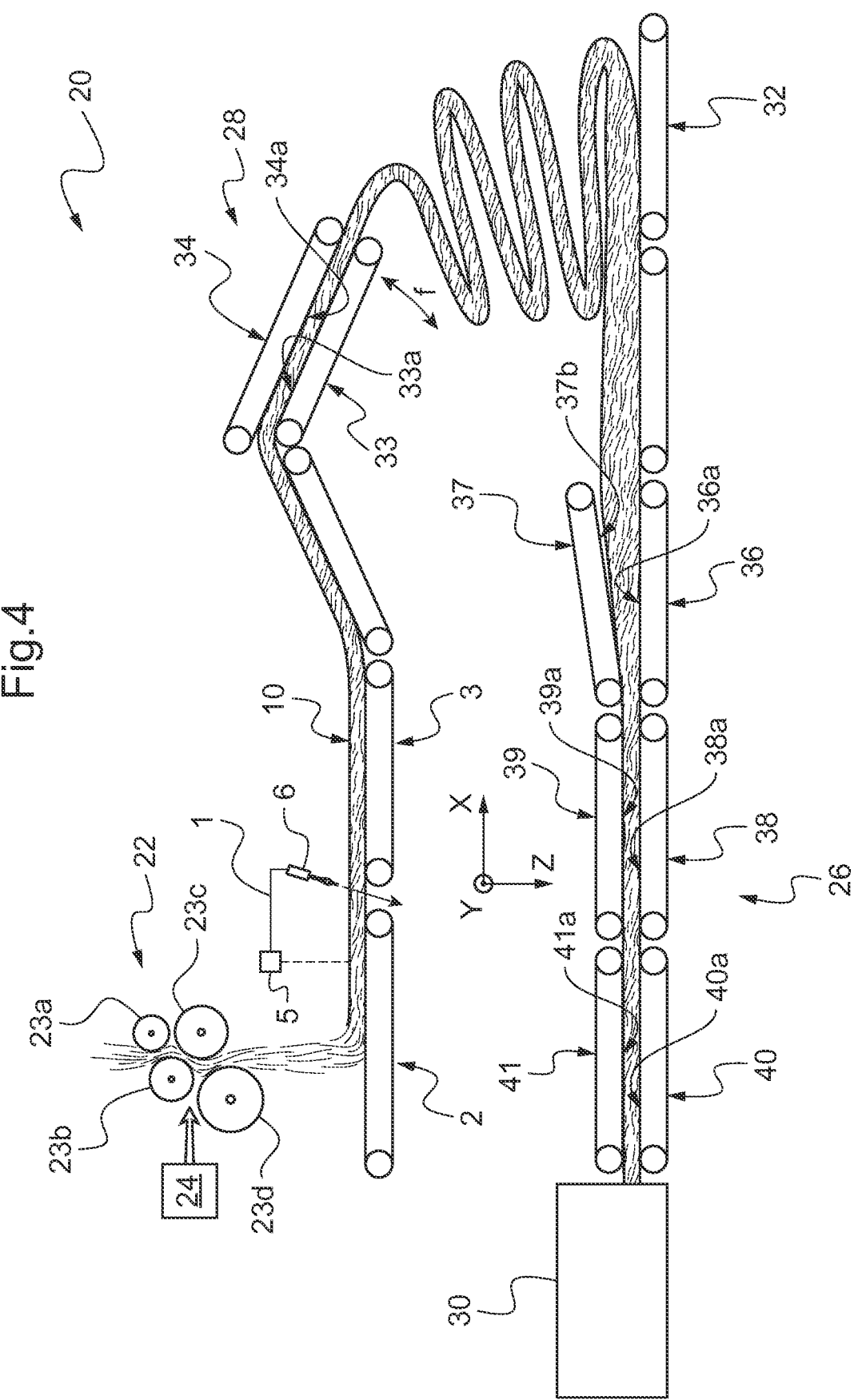
FIG. 4 is a schematic representation of a production line for producing a product based on rock fibers, incorporating a treatment apparatus according to the invention.

FIG. 4 schematically represents a production line 20 for producing a rock wool product, comprising a treatment apparatus according to the invention, in particular of the type described above in connection with FIGS. 1 and 2.

The production line 20 comprises, from upstream to downstream, the following elements:
- a fiberizing device 22 for obtaining rock fibers,
- a device 24 (integrated into the fiberizing machine) for spraying binder on the rock fibers thus obtained,
- an apparatus 1 for treating the mat of fibers resulting from the fiberizing and spraying devices by detection and elimination of localized defects, of the type described above in connection with FIGS. 1 and 2,
- a cross-lapping device 28, and
- a binder crosslinking drying oven 30.

As is known, the fiberizing device 22 comprises a series of four spinning wheels 23a, 23b, 23c, 23d arranged in a cascade, capable of rotating about substantially horizontal axes, in which the first wheel is the smallest 23a, the second wheel 23b is slightly larger, the third and fourth wheels 23c, 23d being very slightly larger and substantially of the same diameter.

The first wheel 23a is supplied with molten material via a chute (not represented) and is essentially used for accelerating the material which is sent to the second wheel 23b, the flow of material decreasing at each wheel in proportion to the amount of fibers formed.

Such a fiberizing device 22 generally comprises, in addition, means for generating, at the periphery of the spinning wheels, a stream of air substantially parallel to the rotational axes of the wheels, for the purpose of assisting the formation of the fibers by an effect of drawing and entraining the fibers in a direction perpendicular to their formation direction.

A binder is sprayed onto the fibers by the spraying device 24 which is fed with binder solution by dedicated means. The mat of fibers 10 is then formed by the accumulation of the fibers on a receiving surface and conveyed in the line by a transport member, to the treatment apparatus 1, according to the invention, for the detection and optional elimination of localized defects, of hot spot type.

It is then transported to the cross-lapping device 28.

The cross-lapping device 28 is suitable for depositing the mineral fibers on a conveyor 32, in the form of several superimposed layers. The basis weight of the mat of fibers is thus increased, which makes it possible to obtain an insulation product with improved thermal and/or acoustic properties. For the sake of simplification, the conveyor 32 is represented in FIG. 4 in alignment with the conveying direction X, whereas it is in reality oriented perpendicularly along the direction Y.

The cross-lapping device 28 is typically vertical. It comprises two belts 33, 34 with main surfaces 33a, 34a, intended to be in contact with the mineral fibers, which are parallel and face each other. The two belts 33, 34 move at the same speed and entrain the fibers between them, against their main faces. The two belts 33, 34 together oscillate about a horizontal axis parallel to their main surfaces, as illustrated by the arrow f in FIG. 1.

The apparatus preferably also comprises a crimping device 26 also referred to as a crimping machine, positioned downstream of the cross-lapping device 28, and which makes it possible to increase the density and to orient the mineral fibers. The crimping machine 26 typically comprises six belts 36, 37, 38, 39, 40, 41 distributed as three successive pairs of belts positioned opposite. Each belt comprises a main surface, respectively 36a, 37a, 38a, 39a, 40a, 41a, intended to be in contact with the mineral fibers.

The belts 36 and 37 of the first pair move at the same speed. The belts 38 and 39 of the second pair move at the same speed (different from the belts of the first pair). The belts 40 and 41 of the third pair move at the same speed (different from the belts of the first and second pairs).

The crimping and cross-lapping operations both help to repair the hole made in the mat resulting from the elimination of a defective portion. Thus, the quality or the esthetics of the final product are not impacted by the treatment operation.

The mat of fibers is then calibrated and transported to the drying oven 30, the temperature of which is for example close to 220° C. The temperature increase and the residence time of the fibrous mat in the drying oven 30 are adjusted to enable the curing of the binder and the elimination of the water. On leaving the drying oven 30, the mat of fibers typically undergoes, with the aid of cutting devices, a longitudinal cutting of its uneven edges, and optionally of the center, a cutting in a transverse direction and optionally in the thickness direction (splitting), so as to obtain blocks that will then be able to be stored in the form of boards or in a roll.

The invention claimed is:

1. An apparatus for treating a mat of mineral fibers moving along a plane and a run direction, by detection and elimination of localized defects, the apparatus comprising:
   a first member for transporting the mat of mineral fibers,
   a second member for transporting the mat of mineral fibers, the second transport member being positioned after the first transport member in the run direction and separated therefrom in said run direction by a treatment zone,
   a device for detecting localized defects in the mat of mineral fibers, located upstream of the treatment zone in the run direction, and
   the treatment zone, a device for eliminating defects suitable for eliminating, in-line, during transportation of the mat of fiber materials and without interruption of the transportation, a defect detected by the detection device by eliminating a portion of mat containing the defect.

2. The treatment apparatus as claimed in claim 1, wherein the detection device comprises at least one infrared radiation detection member.

3. The treatment apparatus as claimed in claim 1, wherein the elimination device is configured so that the portion of mat containing the defect is discharged in an elimination direction that passes through the thickness of the mat.

4. The treatment apparatus as claimed in claim 1, wherein the elimination device is configured so that the portion of the mat containing the defect is discharged in an elimination direction substantially parallel to the normal to the run plane of the mat.

5. The treatment apparatus as claimed in claim 1, wherein the elimination device comprises pressure or pulling means stressing a portion of the mat in an elimination direction.

6. The treatment apparatus as claimed in claim 5, wherein the application direction of the force exerted by the pressure or pulling means forms an angle of between 3° and 20°, with a direction normal to the run plane.

7. The treatment apparatus as claimed in claim 5, wherein the elimination device comprises a plurality of pressure or pulling members, oriented toward the treatment zone, and distributed in a lateral direction of the apparatus.

8. The treatment apparatus as claimed in claim 7, further comprising transmission means for transmitting to the elimination device information on the positioning of the detect in the lateral direction, and means for selective control of each pressure or pulling member as a function of said information.

9. The treatment apparatus as claimed in claim 1, wherein the distance between a first transport surface of the first transport member and a second transport surface of the second transport member is between 50 and 150 mm.

10. The treatment apparatus as claimed in claim 1, further comprising, in the treatment zone, at least one hatch suitable for being opened and closed in a controlled manner under the mat of mineral fibers.

11. A production line for producing a product based on mineral fibers, comprising:
    a fiberizing device for obtaining mineral fibers,
    a device for spraying a binder on said mineral fibers, for the formation of a mat of mineral fibers bound by a binder, and
    a binder crosslinking device,
    wherein the production line further comprises, between the spraying device and the binder crosslinking device, the treatment apparatus as claimed in claim 1.

12. The production line as claimed in claim 11, further comprising a device for cross-lapping the mat of fibers, between the treatment apparatus and the binder crosslinking device.

13. The production line as claimed in claim 11, further comprising a crimping device, between the treatment apparatus and the binder crosslinking device.

14. A process for treating a mat of mineral fibers moving along a plane and a run direction, by detection and elimination of localized defects by the apparatus as claimed in claim 1, the process comprising:
    transporting the mat of mineral fibers on a first transport member, then on a second transport member positioned after the first transport member and separated therefrom by a treatment zone in the run direction,
    detecting localized defects in the mal of mineral fibers, upstream of the treatment zone in the run direction, and
    in the treatment zone, eliminating, in-line, during transportation of the mat of fiber materials and without interruption of the transportation, a detected defect by eliminating a portion of mat containing the defect.

15. The treatment process as claimed in claim 14, wherein the portion of mat containing the defect is discharged in an elimination direction that passes through the thickness of the mat.

16. The treatment process as claimed in claim 14, wherein the mat of mineral fibers is a blanket of mineral fibers bound by an uncured binder.

17. The treatment process as claimed in claim 14, wherein the mat of mineral fibers is a mat of mineral fibers that are not bound by a binder.

18. A process for producing a product based on mineral fibers bound by a binder; comprising at least:
   the obtaining of mineral fibers,
   the spraying of a hinder on said mineral fibers, for the formation of a mat of mineral fibers bound by a binder, and
   the crosslinking of the binder,
   the process further comprising, between the spraying and the crosslinking of the binder, the treatment of the mat of mineral fibers by detection and elimination of localized defects as claimed in the treatment process of claim 14.

19. The treatment apparatus as claimed in claim 1, wherein the mineral fibers are glass fibers or rock fibers.

20. The treatment process as claimed in claim 14, wherein the mineral fibers are glass fibers or rock fibers.

\* \* \* \* \*